May 5, 1970 E. LYGHOUNIS 3,510,596

TELEPHONE SYSTEM

Original Filed April 5, 1965

2 Sheets-Sheet 1

INVENTOR
EVANGELO LYGHOUNIS
BY Irwin S. Thompson
ATTY.

INVENTOR
EVANGELO LYGHOUNIS
BY Irwin S. Thompson
ATTY.

United States Patent Office 3,510,596
Patented May 5, 1970

3,510,596
TELEPHONE SYSTEM

Evangelo Lyghounis, Milan, Italy, assignor to Societa Italiana Telecomunicazioni Siemens S.p.A.

Continuation of application Ser. No. 445,333, Apr. 5, 1965. This application May 5, 1969, Ser. No. 826,047
Int. Cl. H04j 5/00
U.S. Cl. 179—15 10 Claims

ABSTRACT OF THE DISCLOSURE

A means is provided to couple a number of telephone lines at one location to a like number of telephone lines at a remote location by a number of tie lines which is no more than half the number of telephone lines, means being provided for tie lines only to such of the telephone lines as are not idle. Furthermore, coded signals are sent via the tie lines to properly associate the local telephone lines with the remote telephone lines.

Figure 1:
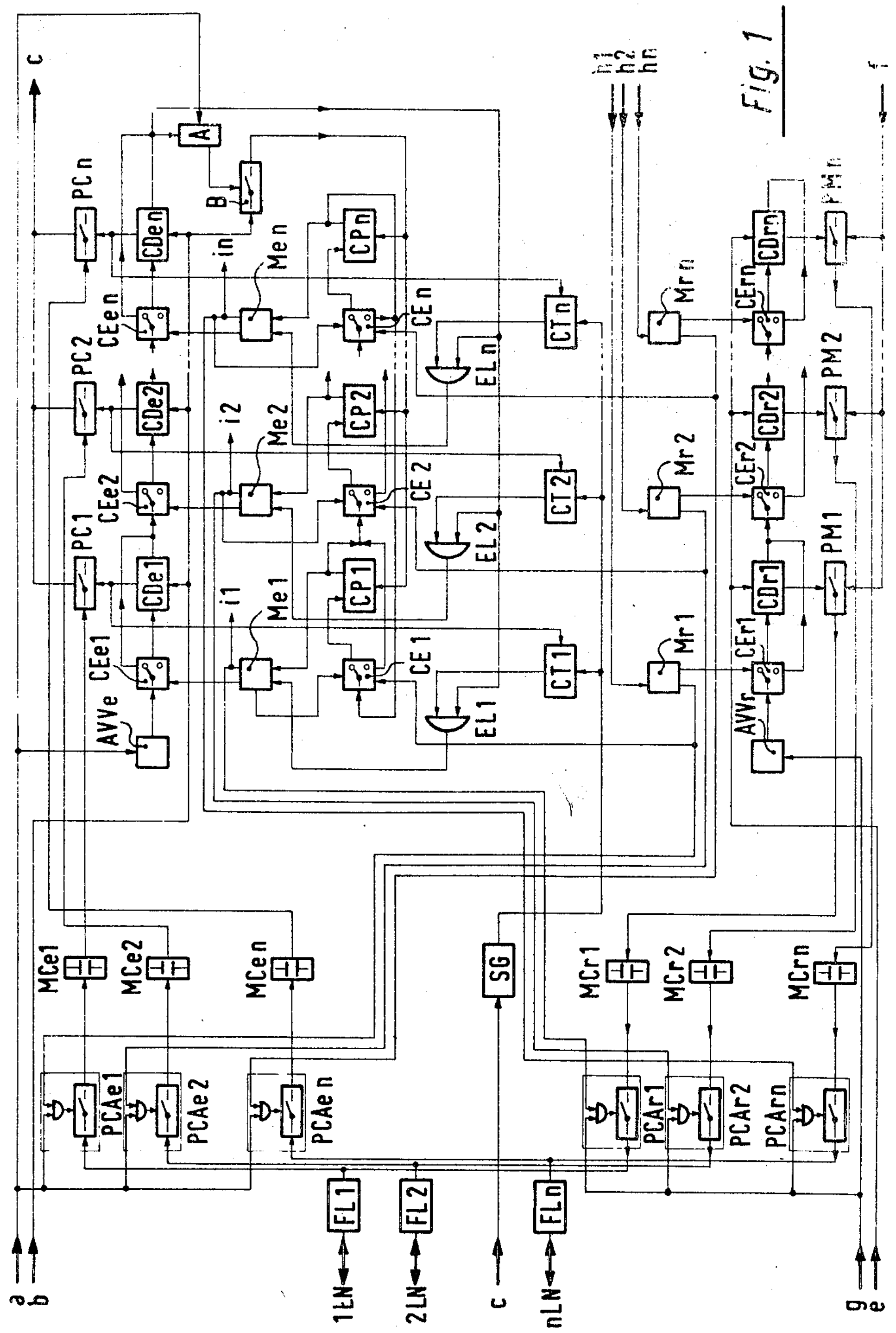

This application is a continuation of application Ser. No. 445,333, filed Apr. 5, 1965, now abandoned.

The present invention relates to improvevments in time allocation telephone signal transmission systems, and more particularly, refers to a time allocation multiplex system using sampling insertion and signal transmission in alternate line directions to use the idle time of telephone channels during an intermittent conversation to link a number $n$ of talking lines to a transmission equipment comprising $m$ channels, where the number of talking lines $n$ is greater than the number of $m$ channels when applied to a time allocation sharing insertion system, hereinafter known as TASI, as understood by those skilled in the art.

When a telephone conversation is being conducted today over conventional communication systems the line is active in each of two directions for less than half the entire talking time used, and in order for such equipment to carry more telephone messages or to increase the message carrying capacity thereof the tendency is to increase the ratio between the number of lines activated and the width of the frequency of the band employed. As most of the frequency bands are already employed, it is practically impossible to obtain additional line carrying capacity by widening the frequency band employed for such use.

The instant invention solves the above transmission problems by uniquely utilizing the idle time of telephone channels during such telephone conversations to interswitch the idle lines employed, for carrying other messages thereby increasing the message carrying capacity of such telephone equipment without allocating more frequencies for use with additional telephone lines to increase the message carrying capacity of such telephone communication systems.

In the instant inventive communication system the connection of talking lines to telephone channels, which may be of any type but frequently are of the frequency allocation type is made by the time allocation sharing insertion equipment, which assigns a channel to each line during the time activity thereof. The TASI equipment as employed in this invention is completely separate from the transmission channels and performs only the task of switching the talking lines to transmission channels in the most efficient manner for additional use thereof. The TASI systems as employed in the instant inventive communication system are very advantageous in providing additional special communication services, which because of their very nature and character necessitate the employment of very costly and complicated communication systems, such as for example, transatlantic cable communication systems. The instant inventive communication systems effect a great saving by employing a lesser number of cable lines for a greater number of messages than usually carried by such cable communication systems.

A primary object of this invention is to provide a signal transmission system comprising an arbitrary number of talking lines designated as letter $n$, in which each of said lines is either active or idle during use, and a number $m$ less than number $n$ of samplings sent into the transmission line.

Another object of this invention is to provide means to sample and to code the telephone signals only on the lines which do not become idle for a time greater than a preferred value, so that the total number of lines having signals coded in each frame is reduced and cannot exceed the preferred number $m$ of samplings for transmission.

A further object of this invention is to provide means for performing simultaneously in transmission the sampling of telephone signals coming from all active or idle communication lines, providing further means so that said signals are not sampled also in reception in the same frame.

Another object of the invention is to provide means for providing the formation and the transmission to a remote terminal of a distributing message in order to permit the correct address of the coded signals to the talking lines in reception at the remote terminal.

A further object of this invention is to provide means in each frame to start the coding of the signals coming from the talking lines which were previously excluded from coding in both transmission and reception.

A yet further object of this invention is to provide means to control the talking line activity connected to the transmission equipment.

Another object of this invention is the provision of memory storage means for controlling the coding of the lines in transmission.

A further object of the invention is to provide a memory feed out means to selectively control the address of the decoded signals in reception.

The present invention makes use of the TASI system in cooperation with pulse code modulation, PCM, equipment, in which coding of signals coming from individual talking lines, is stopped when the respective line becomes idle. Consequently, the maximum number of lines to sample in each sampling frame is in most cases, lower than half the total number of the lines connected to the equipment.

Hence, if the maximum number of samples, feasible in each frame, is fixed at half the total number of talking lines connected to the system, it is not to be expected that there will be a deficiency in the quality of the transmission. In such case, the time required for the completion of a series of samplings is equal to half that required to sample all connected lines in each frame. Having fixed the sampling rate at 8,000 per second, for example, a sampling for each 125 micro-second period, it is clear that, since there is required a lower number of samplings in each frame, there becomes available a longer time for each sampling, and therefore each impulse is of longer duration than would be present if all linked lines should be sampled independently from their activity condition. Because the band width required for pulse transmission is inversely proportional to their duration, a narrow band will be required for pulse transmission. However, because in each frame there is sampled a group of lines which is not the same for all frames, it will be necessary to send an additional message to the remote terminal to make possible the transfer of the coded message to the corresponding lines without mistake. This message will be hereinafter called "distribution message." To meet these requirements the present invention provides a number of additional impulses, in each frame, equal to the number of telephone lines linked in transmission. Therefore, the number of impulses forming a frame, for an $n$ line system, where $n/2$ lines can be sampled in each frame is $$8\frac{n}{2}+n+1=5n+1$$

instead of $8n+1$ required for indiscriminate samplings. (8 is the number of bits used to code the sample amplitude.) The percent increase of available links, for same frequency band width utilized, or using the same switching speed for the equipment means, is then equal to:

$$100\left(\frac{8n+1}{5n+1}-1\right)-100\left(\frac{8n}{5n}-1\right)=60 \text{ percent}$$

From the foregoing it will appear from the following description that the present invention gives a solution to the problem of using the idle time of a given number of telephone channels in the two line directions, without placing a TASI system between the two talking lines and the transmission channels, but makes use of the pulse code modulation equipments. With regard to a classic PCM or pulse code modulation system the cost of the members relative to each talking line is substantially increased, but the common components, such as, coder, decoder, time generator, line repeaters and the like, are fully utilized for a larger number of channels. Therefore, the cost for each talking line is not substantially increased; also this system may be used for very short transmission lines. It is known that maximum efficiency, in transmission systems using silent spaces of an active connection to send additional messages, is obtained by the insertion of echo suppressors to avoid signals, reflected by hybrid coils onto the transmitting lines. This hybrid echo signal cannot be distinguished from any other transmitted signal by the transmitting apparatus, and therefore operates to render "busy" an unoccupied time channel. It is obvious that an echo suppressor does not permit the simultaneous transmission in both directions.

Another point of novelty of the instant invention is that this invention provides means which, from the operational point of view is equivalent to echo suppressor insertion, in that means are provided for preventing the simultaneous transmission in the two directions. The instant communication system, as before mentioned, provides means to stop coding of talking lines which remain idle for a time longer than a predetermined value.

Moreover, devices, which are referred to hereinafter, provide that in each frame the signals coming from a number of talking lines equal to or lower, for instance, than half of those connected to the system, are connected to the transmission equipment in substitution for talking lines over which no signal is being transmitted. If in each line only those lines were coded of which the signals must be sent to the coder, following coding of the same line, would be made in general at time intervals which were not constant. Therefore, it is obvious that, if the coding of some lines be started or stopped during and between frames, the time interval separating the codings, already in course, will be shortened or lengthened. In order to avoid this, coding of all the talking lines is made in all the frames simultaneously. The samples read out are then stored in suitable memory capacitor devices, as understood by those skilled in the art. By means of successive scanning, signals of memory capacitors, pertaining only to the lines which are to be coded, are sent to the coder. Similarly, the received and decoded signals are sent to the memory storage means of respective capacitors by means similar to that used in transmission. Subsequently, the memory storage capacitors discharge their signal samples into the talking lines at the end of each frame simultaneously for all the lines.

Figure 2:
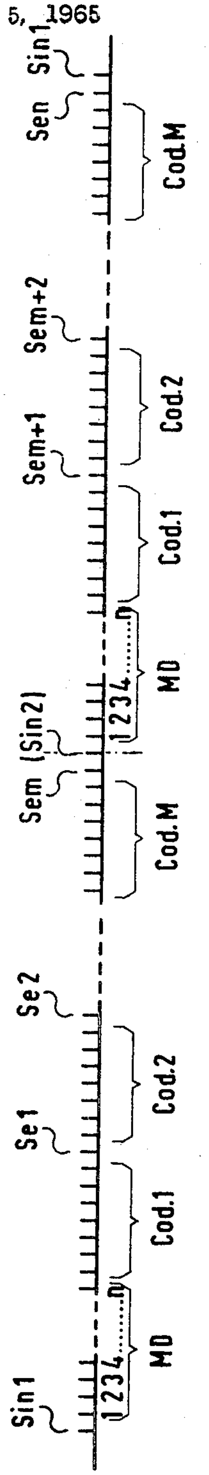

With these and other objects in view, the invention includes certain novel arrangements of and use of various components of a time allocation telephone signal transmission system including various improvements in coding, switching, sampling insertion and signal transmission in alternate directions of a transmission line by uniquely utilizing the idle time of telephone channels during telephone conversations to interswitch the idle lines employed, for carrying other messages to increase the message carrying capacity of such telephone equipment without allocating more frequencies for use with additional telephone lines to increase the message carrying capacity of the above telephone communication systems, examples of which are given in this specification and illustrated in the accompanying drawings, wherein:

FIG. 1 illustrates a preferred embodiment of the terminal equipment of the instant new time allocation signal telephone system using sampling insertion and multiplex signal transmission in alternate line directions, including the characteristics of the system and objects of the present invention; and FIG. 2 illustrates a graph of a pulse succession into the telephone lines, corresponding to this embodiment of the invention.

In the drawing, like reference characters represent like components or parts of the instant invention.

Referring to FIGURE 1, the instant inventive telephone transmission system comprises, in brief, distributing chains, insertion memory components, predisposition chains and time coincidence circuits, a release circuit, gates and sampling circuits, a level control circuit and the like, all cooperating as hereinafter described in detail.

DISTRIBUTING CHAINS

There are two distributing chains as follows: One chain CD*e*1, CD*e*2 . . . CD*en* for the transmission side and one chain CD*r*1, CD*r*2 . . . CD*rn* for the reception side. These chains are similar to those used in a conventional pulse code modulation system, PCM, with the exception that between two stages of the chain is inserted an electronic switching means CE*e*1, CE*e*2 . . . CE*en* and switching means CE*r*1, CE*r*2 . . . CE*rn* in order to reveal, in relation to its place, the bypassing or not of the stage which follows the electronic switch. The operation of the conventional distributing chain is as follows: All the chain stages receive simultaneously the advancing pulses which, in the present case, arrive through wires *b* for the transmission and wires *e* for the reception, but starts only the stage which has received a trigger signal from the preceding stage. To start the chain there is require a starting circuit, respective AVV*e* and AVV*r*, controlled by the respective synchronizing signals coming from wires *a* and *g* which starts the first chain stage. A stage of the distributing chain is associated with each talking line 1LN, 2LN . . . *n*LN. With the help of electronic switches CE*e*1, CE*e*2 . . . CE*en* and CE*r*1, CE*r*2 . . . CE*rn* it is possible to exclude from the chain any number of stages, thus preventing transmission to the coder (not shown), signal samples coming from the respective talking lines, stored in the memory capacitors MC*e*1, MC*e*2 . . . MC*en*, in transmission. The distributing chain operation, in reception, is similar to that in transmission. In transmission the chain CD*e*1, CD*e*2 . . . CD*en* drives the coding gates PC1, PC2 . . . PC*n* and, among all the gates, only those relative to the lines to be inserted will be controlled. In the same way, the distributing chain in reception, drives the relative memory gates PM1, PM2 . . . PM*n*, which transmit the decoded signal samples to memory capacitors MC*r*1, MC*r*2 . . . MC*rn*, relative to the corresponding talking lines. The electronic switchings, relating to transmission and reception distributing chains above are selectively controlled by the corresponding insertion memories.

INSERTION MEMORIES

It is possible, of course, in a system which does not permit simultaneous transmission of telephone signals in both directions, to provide only one insertion memory means for both reception and transmission. In the illustrated embodiment, however, there is used separate insertion bistable memories, for example, M*r*1, M*r*2 . . . M*rn* and M*e*1, M*e*2 . . . M*en* on the transmission side of the system and a bistable memory circuit is provided in each state of the respective distributing chains CD*e*1, CD*e*2 . . . CD*en* and CD*r*1, CR*r*2 . . . CD*rn*. The operation of the transmitting and receiving memory circuits is slightly different, as hereinafter described wherein the operations are effected by such memory storage means.

TRANSMISSION

In transmission, each memory element provides, by its output, with four operations as follows: (a) It positions electronic switches CE*e*1, CE*e*2 . . . CE*en* of the distributing chain on transmission. (b) It gives on its output an indication revealing if one of the lines is inserted or not, or, if the signals will be coded or not, for the purpose of forming the distributing message. (c) It gives an inhibition to circuits of the sampling gates PSA*r*1, PCA*r*2 . . . PCA*rn* relative to the reception side, to prevent the scanning, in reception, of a line which is sampled in transmission. (d) It positions electronic switching means CE1, CE2 . . . CE*n* of the predisposition chain CP1, CP2 . . . CP*n*, to establish the bypassing of the predisposition stages which pertain to lines already inserted for coding in transmission. With regard to the control of each memory circuit this system disposes of a double control, constituted by an insertion signal and a release signal. The insertion signal provides for the insertion of a determined memory stage M*e*1–M*en*. When a stage is inserted, the relative electronic switch CE*e*1–CE*en* is positioned, to establish the code of the signal of that particular line. The "release" or resetting signal determines the release of the memory stage to which it is applied. The word "release" of a memory stage indicates that the later is positioned in such a manner as to exclude, from the scanning cycle, the associated stage of the distributing chain and the corresponding talking line.

RECEPTION

On the reception side, memory elements M*r*1, M*r*2 . . . M*rn* provide the three following operations: (a) The memory elements above position electronic switches CE*r*1, CE*r*2 . . . CE*rn* of the distributing chain during reception. (b) The memory elements also give an inhibition signal to circuits *e* of the sampling gates PCA*e*1, PCA*e*2 . . . PCA*en* pertaining to the transmission side, for preventing the scanning, in transmission of a line that is sampled in reception. (c) The memory elements position electronic switches CE1, CE2 . . . CE*n* of the predisposition chain CP1, CP2 . . . CP*n* for establishing bypassing of the predisposition stages controlling lines already inserted for sampling in reception.

PREDISPOSITION CHAIN AND TIME COINCIDENCE CIRCUITS

The predisposition chain CP1, CP2 . . . CP*n* is of the conventional type, using bistable stages or elements and electronic switches CE1, CE2 . . . CE*n*, interleaved therewith, in order to establish or not the bypassing of said bistable elements. Each bistable element of the chain controls a memory bistable means M*e*1, M*e*2 . . . M*en* in transmission, providing for the insertion or not of the transmission lines *i*1, *i*2 . . . *in*. The *n* stages of the chain are connected in closed cycle. The progress of the chain is determined by output pulses of gate circuit B hereinafter described.

For each forward step of the predisposition chain, a talking line will be inserted. As will be described later, in the sample given, the number of steps, for each frame, is such to obtain for all the frames, a number of inserted lines equal to or lower than half the total number of talking lines.

With regard to the release of the lines, this is controlled by a release pulse, for all the lines, but this is inhibited for all the lines on which appears a signal having a level higher than a prefixed value. It is obvious that all the lines inserted in a frame will not be effectively activated, but from the foregoing, idle or not correctly inserted lines will be excluded from the successive frame, because there is not present the inhibition signal referred to above. With each talking line is associated a time coincidence circuit CT1, CT2 . . . CT*n*. These circuits are activated by two controls. A control of FIG. 1 is common to all circuits and comes from the level circuit SG receiving voltage magnitude measurements successively from all of the *n* talking lines as hereinafter described. Each time a line is inserted for coding, there is present a signal which exceeds the prefixed level, an output pulse is produced, which drives simultaneously all the time coincidence circuits, to each of which there is applied also a signal from the respective coding gates PC1, PC2 . . . PC*n* simultaneously with the closing of the gates, as a result of which, only the time coincidence circuit is activated relative to the line from which arrives the signal at a level higher than the prefixed level. When a time coincidence circuit is "on" its output signal inhibits the "release" signal relative to the corresponding line. If a time coincidence circuit is not driven because the line is idle and the signal is at a level lower than the prefixed value, that circuit declines with a time constant controlable between zero and an arbitrary value, so as to exclude the inhibition voltage on the relative release circuit EL1, EL2 . . . EL*n*. When the release signal will be present, the relative line will be released at the correct time.

RELEASE CIRCUIT

A release circuit involving the outputs of elements EL1, EL2 . . . EL*n* is associated with each talking line, its logic function being to pass or stop the "release" signal in accordance with the presence or absence of the inhibition signal coming from the time coincidence circuits CT1, CT2 . . . CT*n*.

GATES AND SAMPLING CIRCUITS

A sampling gate means PCA*e*1, PCA*e*2 . . . PCA*en* in transmission and another sampling gate means PCA*r*1, PCA*r*2 . . . PCA*rn* in reception are associated with each talking line. In transmission the sampling gate has the purpose to pass power from line filter means FL1, FL2 . . . FL*n*, to corresponding memory capacitors MC*e*1, MC*e*2 . . . MC*en* in transmission, at the sampling instant, which, as before stated, occurs simultaneously for all the talking lines. The sampling gates PCA*r*1, PCA*r*2 . . . PCA*rn*, in reception, provide for the discharge of the memory capacitors MC*r*1, MC*r*2 . . . MC*rn* toward the corresponding line filter means FL1, FL2 . . . FL*n* at the instant of the sampling, which also occurs simultaneously for all the talking lines. In transmission, the sampling gates are driven by respective sampling circuits, which are controlled by the above mentioned insertion memory means, respectively, in transmission and reception, in order to inhibit the sampling, in transmission or reception, of the talking lines which are inserted in either the reception or transmission.

LEVEL CONTROL CIRCUIT SG

This is a conventional circuit passing from the open position to the closed position, when the signal, on its input, is greater than a prefixed value. The input thereof is connected to the input of the coder wire *c* and controls the amplitude-modulated impulses coming from the coding gates. The output thereof, as stated before, controls the time coincidence circuits above.

FIG. 2 shows an example of line succession pulses, in accordance with the features of the present invention. In this system it is assumed that the talking lines are $n$ in number, while $m$ equaling $n/2$ is the maximum number of codings sent into the line. The distributing message MD is sent to the line after a starting synchronizing pulse S*in* 1.

This message above may follow any arbitrary rule, provided that this be identical and prefixed on the transmission side and on the receiving side; in the example illustrated in FIG. 2, in which the distributing message is formed by $n$ impulses, so much as are the talking lines connected to the system. The pulse polarity may or may not determine the insertion of the corresponding talking line depending on the type of operation. Pulses are sent in progressive order, in such a manner that the first pulse corresponds to the first talking line, and the second pulse to the second talking line and the like. After the distributing message there follow normal groups of 8 impulses or bits for each coded sample, seven of which are *Cod*1, *Cod*2 . . . *Codn* of FIG. 2 and are used for coding, and the eighth coded sample, S*e*1, S*e*2 . . . S*en* is used for signaling. It will be noted that the signaling impulses are not depending from the distributing process and precisely from the associated signal coding. The signaling impulses are sent in fixed succession for all $n$ talking lines, independently from the fact that they are inserted or excluded from coding. In the example of FIG. 2, where for clearness, it was assumed that $m$ is equal to $n/2$, signaling impulses S*e*1, S*e*2 . . . S*en* hold two successive frames.

For the same assumption above that $m$ is equal to $n/2$, impulse groups *Cod*1, *Cod*2 . . . *Codm* are in number equal to or lower than half of the total number of talking lines, connected to the system. Intelligence signals relating to the different talking lines, which are effectively coded in each frame, are sent also in successive order to the coder wire $c$ of FIG. 1, and then to the selected line. For instance, if in a determined frame there are coded signals of lines 1, 3, 5, 6, codes relating to each of these latter signals are sent in the same order. As has been mentioned hereinbefore, insertion memory means in transmission determines by means of electronic switches, what lines are those that have signal samples which will be coded in each frame. In the example illustrated, the stage configuration of this memory on the whole, corresponds to the distributing message sent into the line. Therefore, the formation of the above message is controlled by the same memory means in transmission by means of outputs *i*1, *i*2 . . . *in*.

Let us for purposes of illustration, assume that in a given frame signals of $p$ lines were coded, where $p$ is equal to or less than $m$. The logic of the system is provided for a sequence of $m$ impulses for scanning the samples stored in the capacitor memory means. It is obvious that, after the scanning of $p$ coding gates, the $p$th impulse will come out from the $n$th stage of the distributing chain either directly or through electronic switchings operated, overriding position, by respective insertion memory stages. This impulse with its trailing edge drives bistable means A to cause gate B to open for passing remaining $m$ minus $p$ impulses in order to advance the predisposition chain above $p$ to the $m$th step i.e., an additional $m$ minus $p$ steps. After this advancement the chain CP1, CP2 . . . CP*n* remains in this position until the next frame, in which it will advance again in the same manner. With its leading edge instead, the pulse supplies the "release" impulse which, as hereinbefore mentioned, causes the release of these lines, the time coincidence circuit of which, is not excited and this occurs before the predisposition chain advances. Bistable means A returns to its rest position by employing synchronizing pulses. As already mentioned, from the predisposition chain there are excluded all the stages which are inserted in transmission and/or in reception, by means of the electronic switches, inserted between the chain stages. It is obvious therefore, that $m-n$ pulses provide the insertion in transmission of an equal number of lines certainly not inserted in any one of the two directions. It is evident from the foregoing, that the total number of lines inserted in each frame cannot exceed $m$. Among $m-p$ inserted lines, some or all cannot be active in transmission. In this case however the relative time coincidence circuit will not be driven by level control circuit SG and will be released by the impulse of the next frame.

As already mentioned, together with the synchronizing pulse there is effected, in transmission, the simultaneous coding of all the lines not inserted in reception. The samples obtained are stored in the respective memory capacitors and successively some thereof are sent for the coding process.

In reception the insertion memory takes, in each frame, the configuration settled by the distributing message MD coming from the remote terminal. The receiving and transmitting arrangement of the criteria contained in the distributing message are not illustrated in FIG. 1 because they are not indispensable to the present invention. These circuits are connected by wires *h*1, *h*2 . . . *hn* to insertion memory stages in reception. The electronic switches are predisposed so that each signal coming from the decoder wire $f$ through memory gates PM1, PM2 . . . PM*n* charges the corresponding memory capacitor of memory means MC*r*1, MC*r*2 . . . MC*rn*. Simultaneous with the synchronizing impulse, all the memorized samples are transferred to the respective line filters through sampling gates PCA*r*1, PCA*r*2 . . . PCA*rn* in reception. It should be noted that in each frame the gates of the lines inserted in transmission are not driven.

It is to be noted that the operation of the line filter means is the same for transmission as for reception. In fact, transmission and reception circuits are driven respectively by reception and transmission memories and operate so that each filter can be inserted in the transmission circuit when not inserted in that of reception and vice versa. Insertion inhibition in transmission of the channels inserted and in reception does not permit that a signal pass from reception to transmission. This arrangement replaces the use of an echo suppressor and also of a hybrid-coil.

For purposes of clarity, only the first, second and last elements of a chain have been illustrated, but this inventive communication system may be expanded to include any reasonable number of communication lines without departing from this inventive concept, as understood by those skilled in the art.

From the foregoing it will now be seen that there is herein provided an improved time allocation telephone signal transmission system using sampling insertion and signal transmission in alternate directions which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in any limiting sense.

I claim:

1. In a telephone signal transmission system having a number $n$ of talking lines each active or idle from which telephone signals from active lines are coded into a frame and a number $m<n$ of transmission channels to receive samplings from said active talking lines, a time allocation multiplex system comprising means which permit sampling and coding of telephone signals coming from said active talking lines, but which stop the coding of the signals of talking lines which become idle and remain in this stated condition for a time exceeding a predetermined value, so that the total number of talking lines of which the telephone signals are coded in each frame, cannot exceed a number *m* of samplings for transmission, means by which the telephone signals coming from all active and idle talking lines are sampled simultaneously, in transmission and in reception, provided that these are not also sampled in reception or in transmission, respectively, in the same frame, means providing for the formation and transmission to a remote terminal, of a distributing message to ensure that the coded telephone signals are correctly directed to the talking lines in reception at the remote terminal, means permitting in each frame the commencement of coding of signals coming from the talking lines which previously were excluded from coding in transmission and reception, an insertion memory means which controls the coding or non-coding of the lines in transmission, and an insertion memory means which controls the directing of telephonic signals decoded in reception.

2. A signal transmission system as claimed in claim 1, characterized in that by means of a transmission memory employing capacitors the instants of sampling on the talking lines are made to differ from the instants at which the transmission of the sampling values into the line is effected, which memory permits simultaneous sampling, at a constant rate, of all talking lines, which are not sampled in reception, the storing of the samples thus taken, and the subsequent forwarding, for coding, of telephone signals coming from some of the lines, in accordance with the transmission insertion memory configuration, and further characterized in that a reception memory employing capacitors permits storage of the decoded telephone signals distributed in accordance with the received distributing message configuration, and subsequent simultaneous transmission, at a constant rate, to corresponding line filters.

3. A signal transmission system as claimed in claim 2, characterized in that signalling impulses, transmitted as the eighth pulse, after the seventh of each code of telephone signals, are independent of the distributing process, i.e. of the *m* or smaller number of samplings sent into the line, and are transmitted in fixed sequence for all the *n* talking lines, independently of whether these are inserted or excluded from telephone signal sampling.

4. A transmission system as claimed in claim 3, characterized in that the distributing message consists of pulses of which the number is equal to the number *n* of talking lines and that the number of positive or negative impulses, respectively, is equal to or less than the number of samplings *m* sent by the system, the positive pulses, in a predetermined order, defining those talking lines of which the sampling is transmitted or not transmitted, respectively.

5. A signal transmission system as claimed in claim 4, characterized in that the transmission into the line of samplings of which the number is not greater than the maximum predetermined number *m*, is ensured by a sequence of *m* pulses acting on a chain of *n* elements, and that the number of talking lines which can be inserted from time to time for the successive transmission of samplings into the line and for ascertaining whether the said lines have become free in the meantime, is derived from the same pulse sequence, this number being the difference between the number of samplings actually transmitted, and the number *m* of possible samplings.

6. A signal transmission system as claimed in claim 5, characterized in that both edges of the last coding scanning pulse, which acts on the distributing chain, are used in transmission, the first edge being used to control the release of the lines found inactive and the second being used to open a gate through which any further pulses will pass for controlling the insertion of the same number of talking lines in transmission.

7. A signal transmission system as claimed in claim 1, characterized in that a single level control circuit is used in association with the coder in order to test whether the lines inserted for coding are in fact, active, that the responses of the level control circuit are referred to the analyzed circuit in each single instant by means of the same distributing chain which controls the coding, and that the result of the analysis is transmitted to a timing circuit which ensures that exclusion of the active circuits is prevented.

8. A signal transmission system as claimed in claim 1, wherein the transmission and new insertion to the coding process of the talking lines which were momentarily excluded, because previously idle, reoccurs in cycles by means of a chain with permament memory of the reached position, avoiding preferential situations among the talking lines; said chain being affected electrically by the insertion memory in reception in order to avoid the insertion, in transmission, of talking lines.

9. A signal transmission system as claimed in claim 1, in which for each terminal for each talking line there is used a single line filter for both transmission and reception of said telephone signals.

10. A telephone signal transmission system adapted to utilize the idle time of telephone channels during an intermittent conversation to link a number of active telephone lines to encoding transmitting equipment during a time frame comprising, sampling means including a plurality of sampling units connected to sample telephone signals from individual telephone lines, sampling control means operating to initiate or terminate the provision of telephone signals from selected telephone lines to said encoding equipment, said sampling control means including individual sampling control units associated with sampling units for individual telephone lines, said sampling control units being selectively activated or deactivated to respectively pass or block sampled telephone signals, distributing chain means operative to allocate according to time channels the signals sampled by said sampling means, said distributing chain means including a plurality of interconnected, individual stages, each such stage being connected to a sampling control unit and operative in a first state to activate the associated sampling control unit and in a second state to deactivate said associated sampling control unit, pulse means to provide start and shift pulses to said distributing chain means during said time frame to sequentially drive said individual stages to said first state, and bypass means operative to maintain selected individual stages in said second state when said shift pulses are provided to said distributing means, insertion memory means connected to provide control signals to control the operation of said bypass means and predisposition chain means connected to control the operation of said insertion memory means, said predisposition chain means being operative to receive and register the control signals from said insertion memory means indicative of the telephone lines having signals connected to said encoding equipment and to receive and register shift pulses from said distributing chain means indicative of telephone lines having signals blocked from said encoding equipment.

References Cited

UNITED STATES PATENTS

| | | |
|---|---|---|
| 3,311,707 | 3/1967 | Urquhart-Pullen. |
| 3,447,147 | 5/1969 | Deregnaucourt. |

RALPH D. BLAKESLEE, Primary Examiner